US010965363B2

(12) United States Patent
Diaz Sendra

(10) Patent No.: US 10,965,363 B2
(45) Date of Patent: Mar. 30, 2021

(54) SATELLITE TELECOMMUNICATION SYSTEM

(71) Applicant: British Telecommunications Public Limited Company, London (GB)

(72) Inventor: Salvador Diaz Sendra, London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 15/733,441

(22) PCT Filed: Dec. 7, 2018

(86) PCT No.: PCT/EP2018/084028
§ 371 (c)(1),
(2) Date: Jul. 30, 2020

(87) PCT Pub. No.: WO2019/149413
PCT Pub. Date: Aug. 8, 2019

(65) Prior Publication Data
US 2020/0395999 A1    Dec. 17, 2020

(30) Foreign Application Priority Data
Jan. 30, 2018   (EP) .................... 18154144

(51) Int. Cl.
*H04B 7/185* (2006.01)
*H04B 7/204* (2006.01)

(52) U.S. Cl.
CPC ....... *H04B 7/18519* (2013.01); *H04B 7/1853* (2013.01); *H04B 7/2041* (2013.01)

(58) Field of Classification Search
CPC .............. H04B 7/2041; H04B 7/18519; H04B 7/18521; H04B 7/0408; H04B 7/1853
See application file for complete search history.

(56) References Cited

U.S. PATENT DOCUMENTS 5,537,681 A   7/1996   Redden
6,016,124 A   1/2000   Wing
(Continued)

FOREIGN PATENT DOCUMENTS

EP   1052869   11/2000

OTHER PUBLICATIONS

Gaytan et al., IEEE, *Dynamic Scheduling for High Throughput Satellites Employing Priority Code Scheme*, Oct. 2015, 11 pages.
(Continued)

*Primary Examiner* — Keith Ferguson
(74) *Attorney, Agent, or Firm* — Patterson Thuente Pedersen, P.A.

(57) ABSTRACT

This disclosure relates to a method in a satellite telecommunications system, and a device for performing the method, the satellite telecommunications system including one or more satellites, wherein the one or more satellites are configured to transmit data via a first plurality of spotbeams, the method including analyzing data relating to the first plurality of spotbeams; identifying a set of spotbeams of the first plurality of spotbeams based on the analysis; assigning a group identifier to each spotbeam of the set of spotbeams; and sending an update message to the one or more satellites associated with each spotbeam of the set of spotbeams, the update message including the group identifier.

5 Claims, 11 Drawing Sheets

(56) References Cited

U.S. PATENT DOCUMENTS

| | | | | |
|---|---|---|---|---|
| 6,522,864 | B1* | 2/2003 | Febvre | H04B 7/2041 455/12.1 |
| 7,728,766 | B2 | 6/2010 | Draganov | |
| 9,680,559 | B1 | 6/2017 | Freedman | |
| 2002/0089943 | A1 | 7/2002 | Faineant | |
| 2016/0165456 | A1 | 6/2016 | Bhanu | |

OTHER PUBLICATIONS

Great Britain Search Report, Application No. GB1801477.9, dated Jul. 17, 2018, 6 pages.

International Search Report, Application No. PCT/EP2018/084028, dated Feb. 21, 2019, 12 pages.

Filali, Issues on the IP Multicast Service Behaviour over the Next-Generation Satellite-Terrestrial Hybrid Networks, 2004, 8 pages.

Great Britain Search Report, Application No. 18154144.2, dated Jul. 31, 2018, 11 pages.

* cited by examiner

SATELLITE TELECOMMUNICATION SYSTEM

PRIORITY CLAIM

The present application is a National Phase entry of PCT Application No. PCT/EP2018/084028, filed Dec. 7, 2018, which claims priority from EP Patent Application No. 18154144.2, filed Jan. 30, 2018, each of which is hereby fully incorporated herein by reference.

TECHNICAL FIELD

The present disclosure relates to a satellite telecommunication system. In particular, but not exclusively, the satellite telecommunication system may be part of, or cooperate with, a cellular telecommunication system.

BACKGROUND

A satellite telecommunications system typically includes one or more satellites that each transmit data to user terminals. The satellite may transmit data via a transmission beam (typically known as a "spotbeam" when referring to satellite communications), and the coverage area of a spotbeam may cover a region the size of city, a country, or a continent depending on its application. The satellite (or satellites) may also transmit data via a plurality of spotbeams, which each partially overlap such that the overall coverage area of the satellite communication system is made up of the coverage areas of each spotbeam.

The satellite telecommunication system receives content from a terrestrial content provider for transmission via its one or more spotbeams. This may be live content such that it transmitted immediately or shortly after reception, or the content may be pre-populated for local storage and subsequent transmission. A content provider must send its content to each satellite having a spotbeam in which a user is consuming that content. The content provider must therefore maintain connections with all satellites (or at least their associated resource managers) to ensure that its content may be consumed by users in any spotbeam of the satellites. It is desirable to alleviate the above problems.

SUMMARY

According to a first aspect of the disclosure, there is provided a method for a satellite telecommunications system including one or more satellites, wherein the one or more satellites are configured to transmit data via a first plurality of spotbeams, the method comprising the steps of: analyzing data relating to the first plurality of spotbeams; identifying a set of spotbeams of the first plurality of spotbeams based on the analysis; assigning a group identifier to each spotbeam of the set of spotbeams; sending an update message to the one or more satellites associated with each spotbeam of the set of spotbeams, the update message including the group identifier; and distributing content to the one or more satellites for transmission by each spotbeam of the set of spotbeams, wherein the content is distributed using the group identifier.

Embodiments of the present disclosure allow a resource manager to define a logical satellite coverage area that covers several spotbeams, and that logical satellite coverage area is addressable by a single group identifier. The several spotbeams making up this logical satellite coverage area may be associated with different satellites. The content provider may therefore select a region to send its content based on the group identifier and its logical satellite coverage area, without any knowledge of the satellites associated with that coverage area and without maintaining connections to those satellites.

The satellite communication system may include a first satellite and a second satellite, the first satellite is configured to transmit via the first plurality of spotbeams, and the second satellite is configured to transmit via a second plurality of spotbeams, and the method may comprise analyzing data relating to the first and second plurality of spotbeams; and identifying the set of spotbeams of the first and second plurality of spotbeams based on the analysis.

The method may further comprise receiving, from a terminal, a spotbeam identifier identifying the spotbeam that the terminal is associated with; recording an association between the terminal and the spotbeam identifier, wherein the step of analyzing data relating to the first plurality of spotbeams includes analyzing data for the terminal.

According to a second aspect of the disclosure, there is provided a computer program comprising instructions which, when the program is executed by a computer, cause the computer to carry out the method of the first aspect of the disclosure. The computer program may be stored on a computer-readable data carrier.

According to a third aspect of the invention, there is provided a device for a satellite telecommunications system, the satellite telecommunications system including one or more satellites, wherein the one or more satellites disclosure configured to transmit data via a first plurality of spotbeams, the device comprising a processor configured to carry out the method of the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
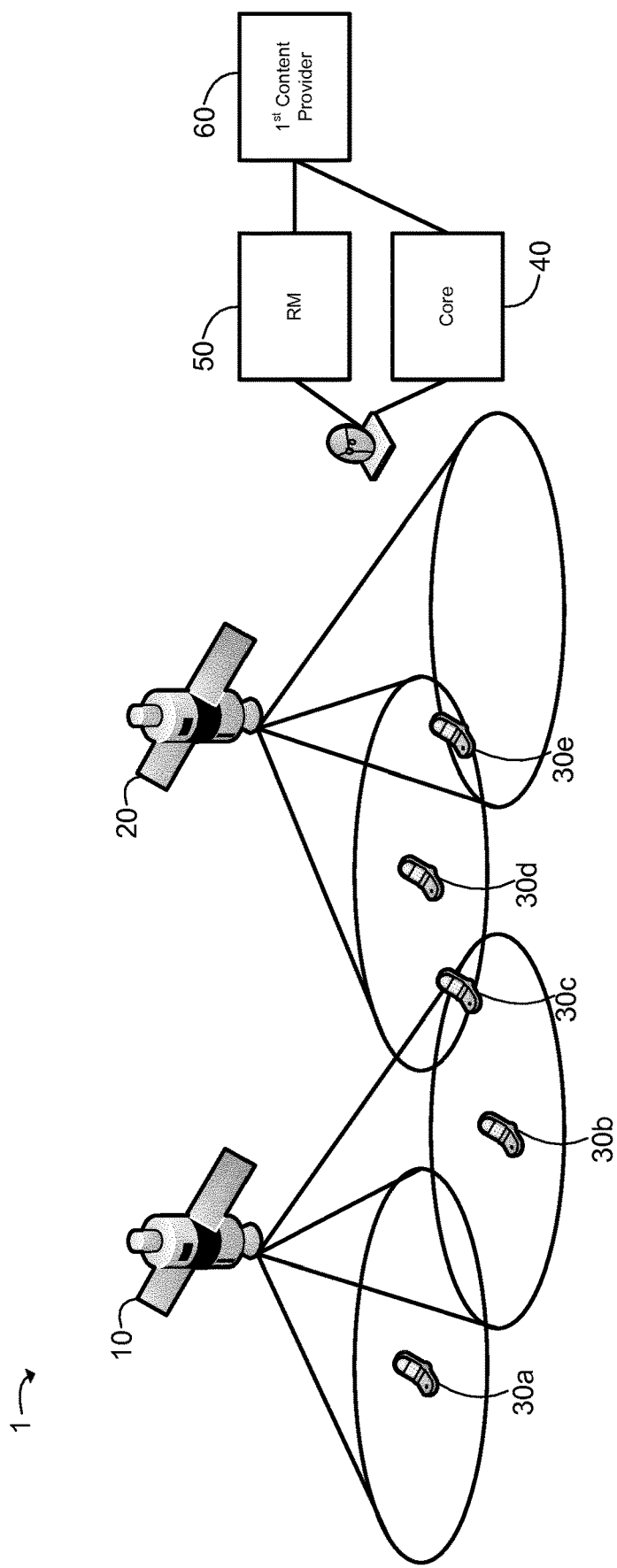
FIG. 1 is a schematic diagram of a satellite telecommunications system of an embodiment of the present disclosure.

A first embodiment of a satellite telecommunication system 1 of the present disclosure will now be described with reference to FIGS. 1 to 3. The satellite telecommunication system 1 includes a first satellite 10, a second satellite 20, a plurality of satellite terminals 30a . . . 30e, a cellular core network 40, a resource manager 50, and a first content provider 60. In this embodiment, the satellite telecommunication system 1 is part of a cellular telecommunications system, such that one or more of the satellite terminals 30a . . . 30e may be also be configured to communicate with a plurality of base stations (not shown) of the cellular telecommunications system and such that the cellular core network 40 manages both the satellite telecommunications system 1 and the plurality of base stations. FIG. 1 illustrates the first satellite 10 transmitting via a first plurality of spotbeams and the second satellite 20 transmitting via a second plurality of spotbeams.

Figure 2:
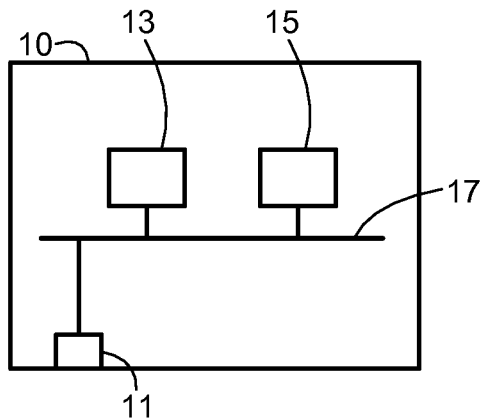
FIG. 2 is a schematic diagram of a satellite of the system of FIG. 1.

The first satellite 10 is shown in more detail in FIG. 2. The first satellite includes a transceiver 11 configured to transmit signals to the satellite terminals 30a . . . 30e via the first plurality of spotbeams. The transceiver 11, processor 13 and memory 15 are all connected via bus 17. In this embodiment, memory 15 stores a first database which stores, for each of the first plurality of spotbeams, a static spotbeam identifier (uniquely identifying one of the first plurality of spotbeams from all other spotbeams, and includes a first part identifying the first satellite and a second part identifying a spotbeam from the first plurality of spotbeams transmitted by the first satellite) and a dynamic spotbeam identifier. Whilst the static spotbeam identifier does not change, the dynamic spotbeam identifier may be modified (e.g. in response to an instruction from the resource manager 50) to take a different value, including one that is already being used as a dynamic spotbeam identifier for another spotbeam. Furthermore, both the unique and dynamic spotbeam identifiers are transmitted as part of the spotbeam. The purpose of these spotbeam identifiers will become clear upon review of the embodiments of the method of the disclosure.

Memory 15 is further configured to receive content from external sources (e.g. the first content provider 60) and store it (at least in the form of a buffer) for subsequent transmission. The processor 13 is configured to retrieve content from memory 15 and provide it to the transceiver 11 for transmission, which, in this embodiment, may be tailored to a particular spotbeam. Thus, the first satellite 1 is configured to transmit customized content in each spotbeam. Embodiments of this disclosure, discussed below, provide a method for the content providers to populate memory 15 of the first satellite 10 with the content to be transmitted in each spotbeam in an efficient manner.

The second satellite is substantially the same as the first satellite, such that its memory also contains a first database which stores, for each of the second plurality of spotbeams, a static spotbeam identifier (uniquely identifying one of the second plurality of spotbeams from all other spotbeams, including those of the first plurality of spotbeams from the first satellite 10) and a dynamic spotbeam identifier.

Figure 3:
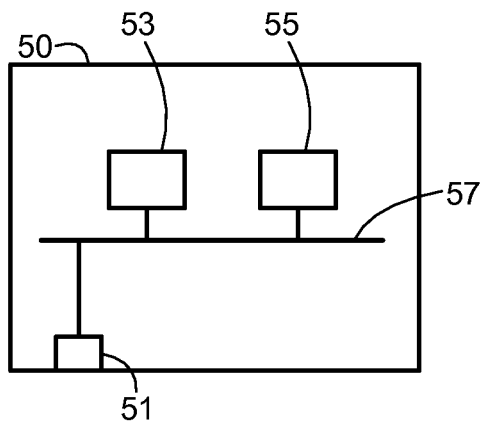
FIG. 3 is a schematic diagram of a resource manager of the system of FIG. 1.

The resource manager 50 is shown in more detail in FIG. 3. The resource manager 50 includes a transceiver 51, a processor 53 and memory 55, all connected via bus 57. The transceiver 51 is configured to communicate with the cellular core network 40, the first content provider 60, and with the first and second satellites 10, 20. The communication link to the first and second satellites 10, 20 may be via an external antenna suited for satellite communications. Memory 55 includes a first database which associates a satellite terminal (of the satellite terminals 30a . . . 30e) with one or more dynamic spotbeam identifiers associated with one or more of the first and second plurality of spotbeams. Memory 55 further includes a second database which associates a unique spotbeam identifier and its associated dynamic spotbeam identifier. Techniques for creating, updating and using this database will be explained in more detail in the discussion of the embodiments of the method of the disclosure, below.

Figure 4:
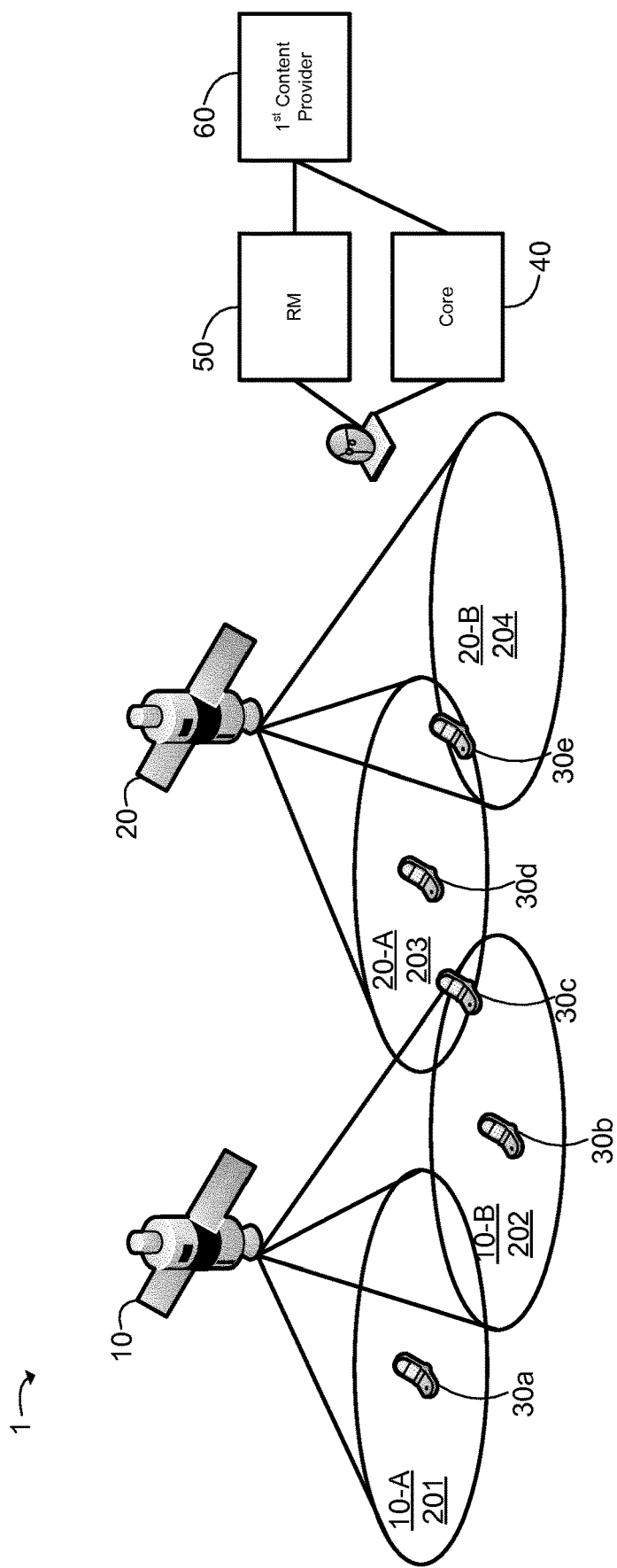
FIG. 4 is a schematic diagram of the system of FIG. 1 in a first state.
Figure 5:
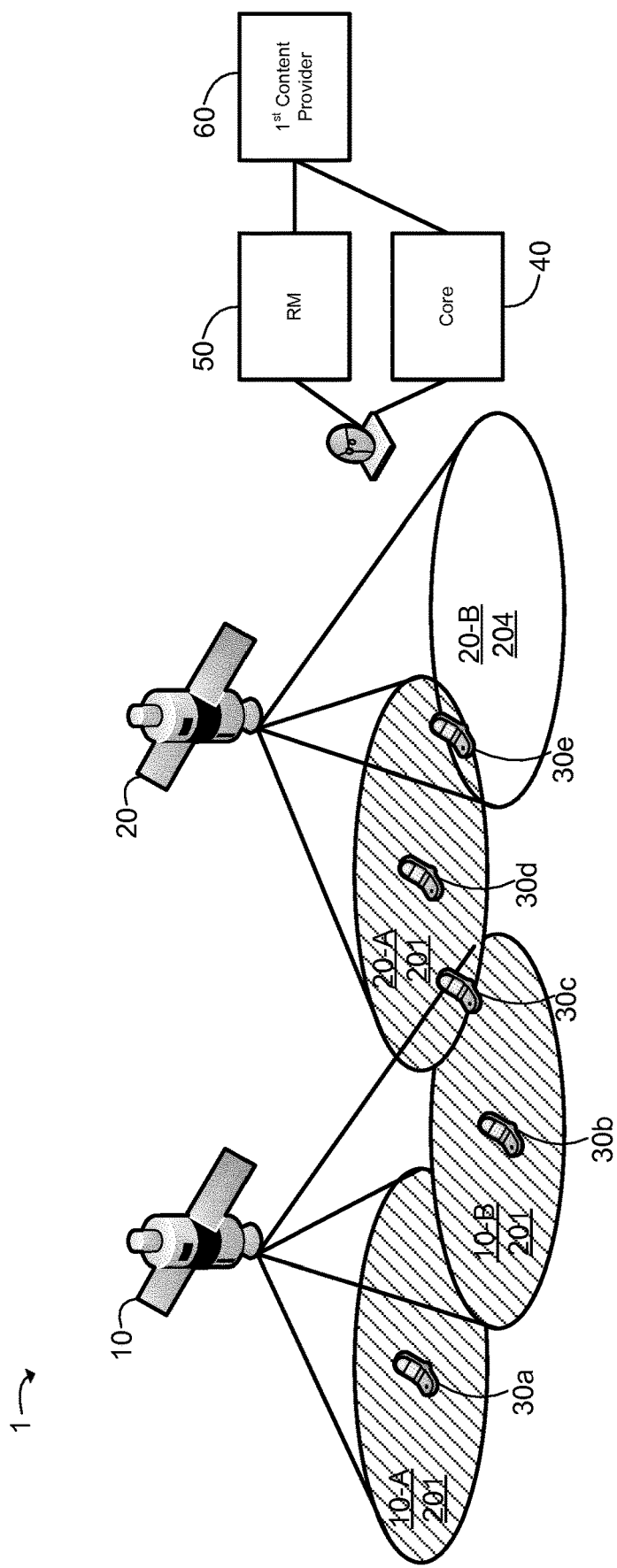
FIG. 5 is a schematic diagram of the system of FIG. 1 in a second state.

A first embodiment of a method of the present disclosure will now be described with reference to FIGS. 4 to 6. At time t, as shown in FIG. 4, the first satellite 10 has a first database storing the following values:

TABLE 1

Table illustrating the spotbeam identifiers
for the first plurality of spotbeams

| Unique Spotbeam Identifier | Dynamic Spotbeam Identifier |
|---|---|
| 10-A | 201 |
| 10-B | 202 |

Furthermore, at time t, the second satellite 20 has a first database storing the following values:

TABLE 2

Table illustrating the spotbeam identifiers
for the second plurality of spotbeams

| Unique Spotbeam Identifier | Dynamic Spotbeam Identifier |
|---|---|
| 20-A | 203 |
| 20-B | 204 |

The first and second satellites 10, 20 therefore transmit their respective first and second spotbeams with their associated content and spotbeam identifiers. FIG. 4 also illustrates the locations of each satellite terminal of the plurality of satellite terminals 30a . . . 30e, which are each within one or more of the spotbeams of the first and/or second plurality of spotbeams.

Figure 6:
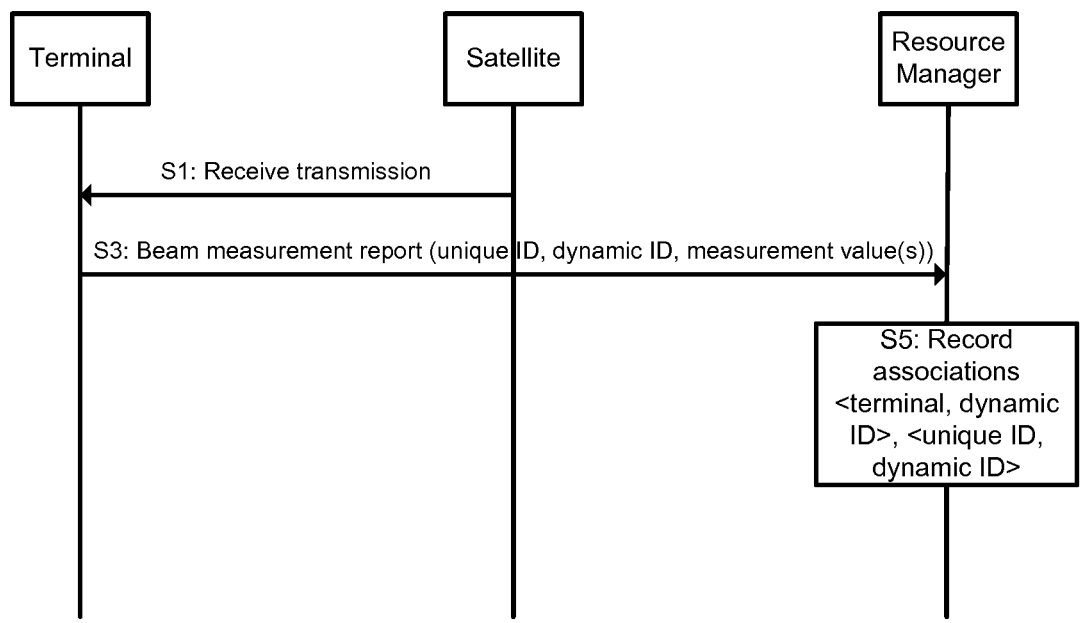
FIG. 6 is a call flow diagram illustrating a first embodiment of a method of the present disclosure.

Turning to FIG. 6, in S1 of the method of this first embodiment of the disclosure, a first satellite terminal 30a receives a transmission via a first spotbeam (unique ID=10-A) of the first plurality of spotbeams from the first satellite 10. The first satellite terminal 30a decodes the unique and dynamic spotbeam identifiers (=10-A, 201) and performs one or more measurements on the first spotbeam (such as Signal to Noise Ratio (SNR), Reference Signal Received Power (RSRP)). In S3, the first satellite terminal 30a sends a reporting message to the resource manager 50, which includes the unique and dynamic spotbeam identifiers (=10-A, 201) and further includes the measurements for the first spotbeam.

In S5, the resource manager 50 receives this message and records, in its first database, an association between the first satellite terminal (e.g. by its International Mobile Subscriber Identifier, IMSI) and the dynamic spotbeam identifier of the first spotbeam (Dynamic ID=201), and, in its second database, an association between the unique spotbeam identifier (=10-A) and the dynamic spotbeam identifier (=201).

This process is performed for each satellite terminal of the plurality of satellite terminals, 30a . . . 30e, such that the resource manager 50 receives messages from each satellite terminal indicating a dynamic spotbeam identifier associated with that terminal and the respective unique spotbeam identifier. As the satellite terminals may be located within an overlapping portion of several spotbeams, including an overlapping portion of a spotbeam of the first plurality of spotbeams and a spotbeam of the second plurality of spotbeams, then the message may indicate a plurality of unique spotbeam identifiers associated with that terminal. Thus, at time t as shown in FIG. 4, the resource manager's first and second databases record the following associations:

TABLE 3

Table illustrating the dynamic spotbeam identified(s) associated with each satellite terminal at time t

| Satellite Terminal | Associated Dynamic Spotbeam Identifier(s) |
|---|---|
| 30a | 201 |
| 30b | 202 |
| 30c | 202, 203 |
| 30d | 203 |
| 30e | 203, 204 |

TABLE 4

Table illustrating the unique spotbeam identifier and associated dynamic spotbeam identifier at time t

| Unique Spotbeam Identifier | Associated Dynamic Spotbeam Identifier |
|---|---|
| 10-A | 201 |
| 10-B | 202 |
| 20-A | 203 |
| 20-B | 204 |

The process illustrated in FIG. 6 may be triggered in response to an event (e.g. RSRP of serving satellite dropping below a threshold) or may be time driven. Accordingly, each satellite terminal 30a . . . 30e may periodically send messages to the resource manager 50 identifying (and providing measurements of) the spotbeam identifiers for each spotbeam it receives a transmission from at that time. These may have changed due to the satellite terminal moving to a new location such that it receives transmissions from different spotbeams, and/or due to the dynamic spotbeam identifier changing. The resource manager 50 may update its first and second databases in response to the new message. Thus, at time t+1, as shown in FIG. 5, the dynamic spotbeam identifiers have changed such that the first and second spotbeams of the first plurality of spotbeams (unique IDs=10-A, 10-B) and the first spotbeam of the second plurality of spotbeams (Unique ID=20-A) use dynamic spotbeam identifier 201, whilst the second spotbeam of the second plurality of spotbeams (Unique ID=20-B) uses dynamic spotbeam identifier 204. This creates a logical satellite coverage area defined by the combined coverage areas of the three spotbeams (Unique IDs=10-A, 10-B, 20-A), which is shown in hatching in FIG. 5. Upon receiving transmissions including these new dynamic spotbeam identifiers, each satellite terminal 30a . . . 30e sends a message to the resource manager 50 indicating the new dynamic spotbeam identifier, and the resource manager 50 updates its first and second databases, thus:

TABLE 5

Table illustrating the dynamic spotbeam identified(s) associated with each satellite terminal at time t + 1

| Satellite Terminal (IMSI) | Associated Dynamic Spotbeam Identifier(s) |
|---|---|
| 30a | 201 |
| 30b | 201 |
| 30c | 201 |
| 30d | 201 |
| 30e | 201, 204 |

TABLE 6

Table illustrating the unique spotbeam identifier and associated dynamic spotbeam identifier at time t + 1

| Unique Spotbeam Identifier | Associated Dynamic Spotbeam Identifier |
|---|---|
| 10-A | 201 |
| 10-B | 201 |
| 20-A | 201 |
| 20-B | 204 |

By implementing the above method of the first embodiment of the disclosure, the resource manager 50 is able to store a current association between each satellite terminal and the dynamic spotbeam identifier of each spotbeam it may receive transmissions from, and an association between the unique spotbeam identifier and dynamic spotbeam identifier for each spotbeam in the satellite communications system. Embodiments illustrating the usefulness of these databases will now be described.

Figure 7:
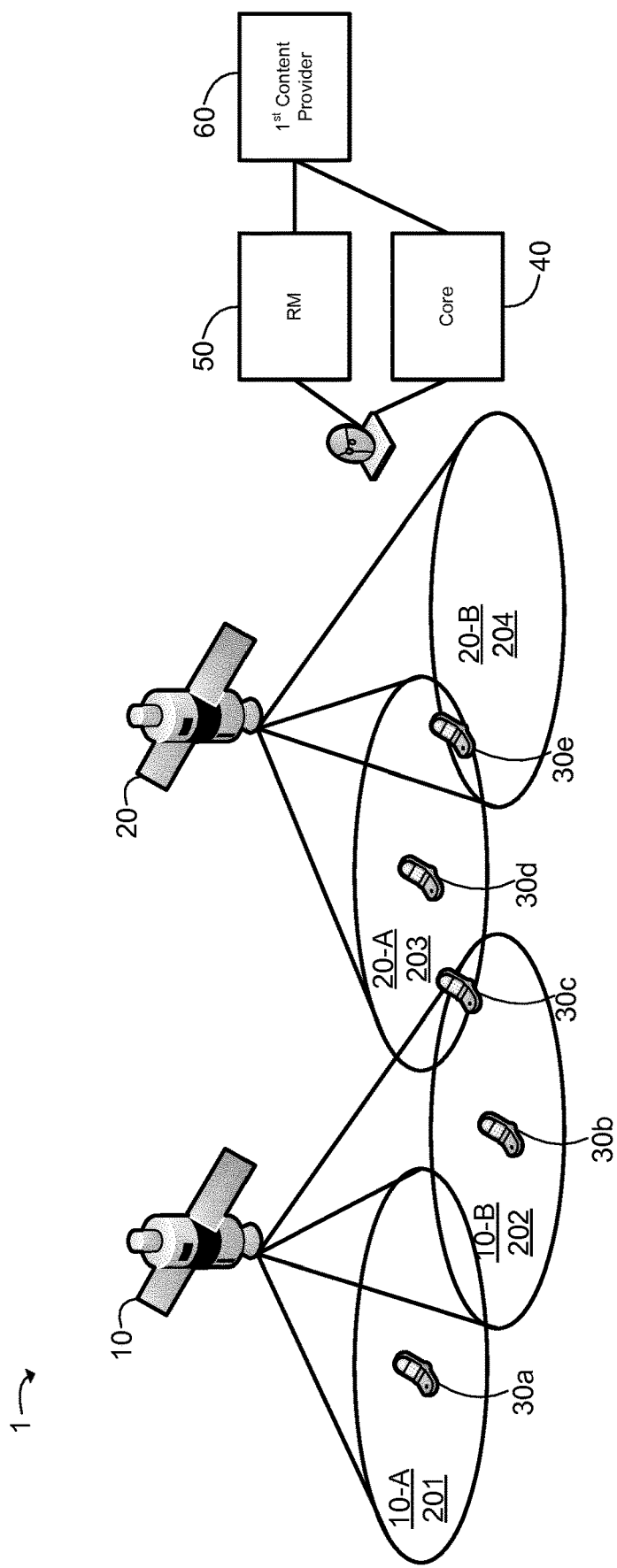
FIG. 7 is a schematic diagram of the system of FIG. 1 in a third state.
Figure 8:
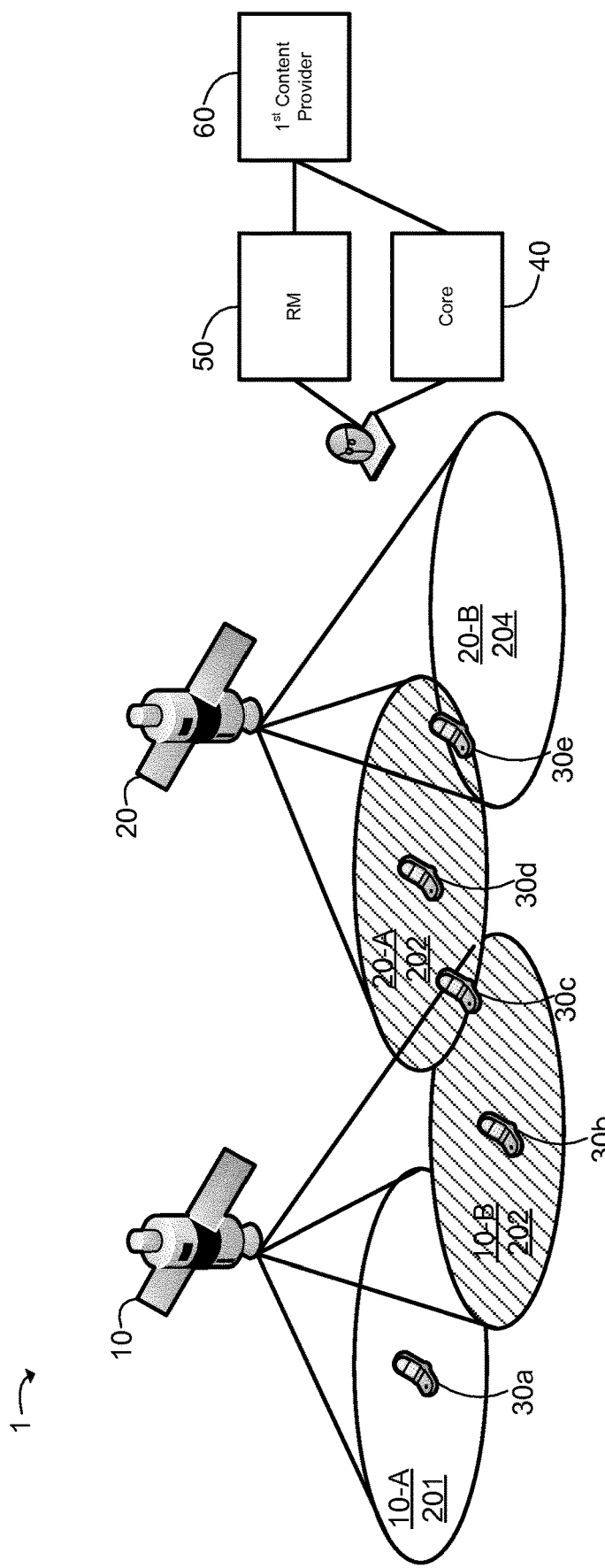
FIG. 8 is a schematic diagram of the system of FIG. 1 in a fourth state.
Figure 9:
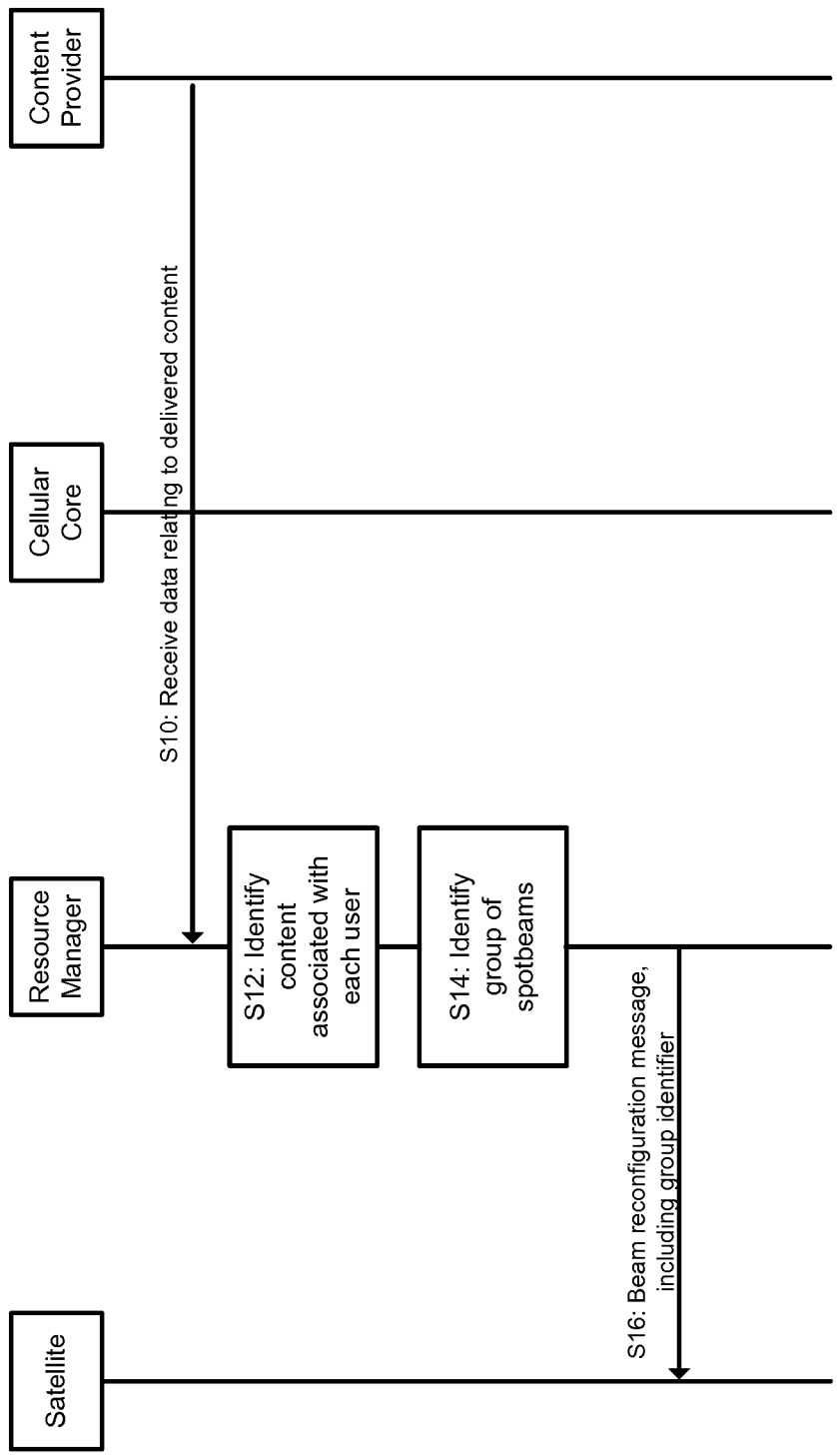
FIG. 9 is a call flow diagram illustrating a second embodiment of a method of the present disclosure.

A second embodiment of the disclosure will now be described with reference to FIGS. 7, 8 and 9. The network 1 is initially in a state as shown in FIG. 7, such that the first and second plurality of spotbeams have the spotbeam identifiers as identified in Table 4 above. In a first step (S10) of this second embodiment as shown in FIG. 9, the resource manager 50 receives data identifying content being delivered to users in the satellite and/or cellular telecommunications system. This data may be sent, for example, from the first content provider 60 to the resource manager 50. The data contains an identifier for the terminal which is consuming the data which, in this embodiment, is the terminal's IMSI.

In S12, the resource manager 50 identifies the content associated with each user, and adds this data to its first database:

TABLE 7

Table illustrating the resource manager's first database, including content

| Satellite Terminal | Associated Dynamic Spotbeam Identifier(s) | Content |
|---|---|---|
| 30a | 201 | A |
| 30b | 202 | B |
| 30c | 202, 203 | C |
| 30d | 203 | B |
| 30e | 203, 204 | D |

In response, in S14, the resource manager 50 determines that terminals 30b and 30d, which are located within the spotbeams identified by unique spotbeam identifiers 10-B and 20-A respectively and by dynamic spotbeam identifiers 202 and 203 respectively, are both consuming content B. In response, in S16, the resource manager sends a beam reconfiguration message to the second satellite 20 to reconfigure its first beam (Unique ID=20-A) to use dynamic beam identifier 202. Following this reconfiguration, the second satellite's first database contains the following records:

TABLE 8

Table illustrating the spotbeam identifiers
for the second plurality of spotbeams

| Unique Spotbeam Identifier | Dynamic Spotbeam Identifier |
|---|---|
| 20-A | 202 |
| 20-B | 204 |

Furthermore, the second satellite 20 then transmits its first beam (Unique ID=20-A) with the dynamic spotbeam identifier 202. Satellite terminal 30d, which is positioned within the first spotbeam of the second plurality of spotbeams (Unique ID=20-A), decodes the unique and dynamic spotbeam identifiers (=20-A, 202) and reports them to the resource manager 50. The resource manager 50 updates its first and second databases, thus:

TABLE 9

Table illustrating the resource manager's first database, including
content, following the second satellite's beam reconfiguration

| Satellite Terminal | Associated Dynamic Spotbeam Identifier(s) | Content |
|---|---|---|
| 30a | 201 | A |
| 30b | 202 | B |
| 30c | 202, 203 | C |
| 30d | 202 | B |
| 30e | 202, 204 | D |

TABLE 10

Table illustrating the resource manager's second
database, including the unique spotbeam identifier
and associated dynamic spotbeam identifier following
the second satellite's beam reconfiguration

| Unique Spotbeam Identifier | Associated Dynamic Spotbeam Identifier |
|---|---|
| 10-A | 201 |
| 10-B | 202 |
| 20-A | 202 |
| 20-B | 204 |

In this manner, the second spotbeam of the first plurality of spotbeams (Unique ID=10-B) and the first spotbeam of the second plurality of spotbeams (Unique ID=20-A) both have the same dynamic spotbeam identifier of 202. This creates a logical coverage area of satellite beams (as shown by hatching in FIG. 8), in which these two spotbeams may thereafter be addressed by other entities in the network 1 by the same dynamic spotbeam identifier (202).

The benefits of this second embodiment are that the resource manager 50 may define a logical satellite coverage area which contains one of more spotbeams from the first and/or second plurality of spotbeams (of the first and/or second satellite 10, 20 respectively), and this logical satellite coverage area is addressable using a single identifier (the dynamic spotbeam identifier). As will be shown in the third embodiment of the invention (described below), the logical satellite coverage area may then be used by content providers to populate content to these logical satellite coverage areas (via one or more spotbeams) without the content provider having any knowledge of which spotbeams make up that coverage area.

Before describing the third embodiment, it is noted that the above second embodiment is just one method by which the logical satellite coverage area may be created and updated. That is, the above embodiment describes a way in which a content provider may provide usage statistics to identify which terminals are consuming particular content, which may then be analyzed to identify a logical satellite coverage area. These statistics may be provided at regular intervals, such as once a day, once a week, once a month, etc. However, these logical satellite coverage areas may be created and updated based on other analyses, such as by collecting usage data from multiple content providers (such as when the same content is being distributed by different content providers), by predicting in advance when particular content is going to be consumed by users over a particular geographical region (such as, for example, when a sports team associated with that region have a scheduled match), or by identifying patterns in prior usage statistics such that it may be predicted that a geographical region will consume particular content. Accordingly, the resource manager 50 may implement any suitable process to update the logical satellite coverage area covered by one or more spotbeams of the first and/or second plurality of spotbeams, wherein each spotbeam of the logical coverage area is addressable by the same dynamic spotbeam identifier.

Figure 10:
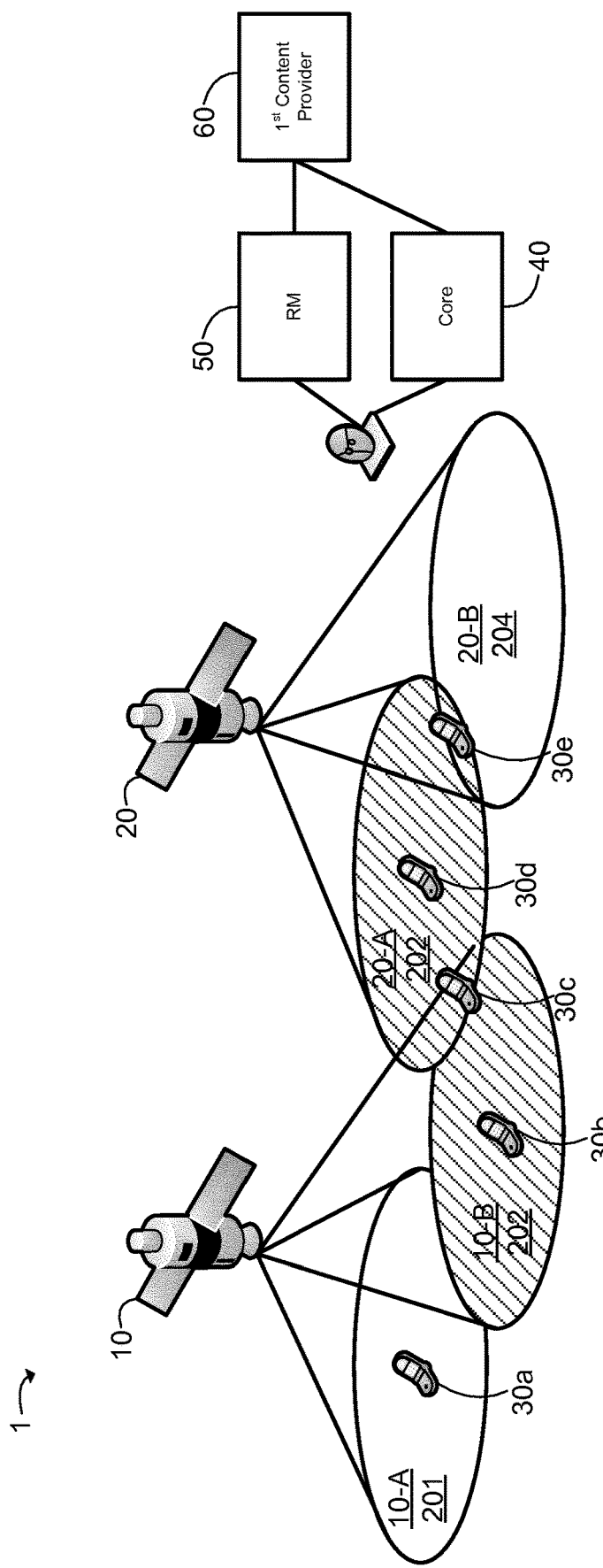
FIG. 10 is a schematic diagram of the system of FIG. 1 in a fifth state.

A third embodiment of the disclosure will now be described with reference to FIGS. 10 and 11. In this embodiment, the system is in the configuration shown in FIG. 10, such that the satellite terminals 30a . . . 30e are positioned as shown and the spotbeams are transmitted with the unique and dynamic spotbeam identifiers set out in Table 10 above. That is, a logical satellite coverage area has been created in which the second spotbeam of the first plurality of spotbeams (Unique ID=10-B) and the first spotbeam of the second plurality of spotbeams (Unique ID=20-A) both have the same dynamic spotbeam identifier of 202. This embodiment provides a method for the first content provider 60 to populate the associated satellites with content based on this logical satellite coverage area, which, in this embodiment, has been identified as the target area for the content based on a predictive analysis.

Figure 11:
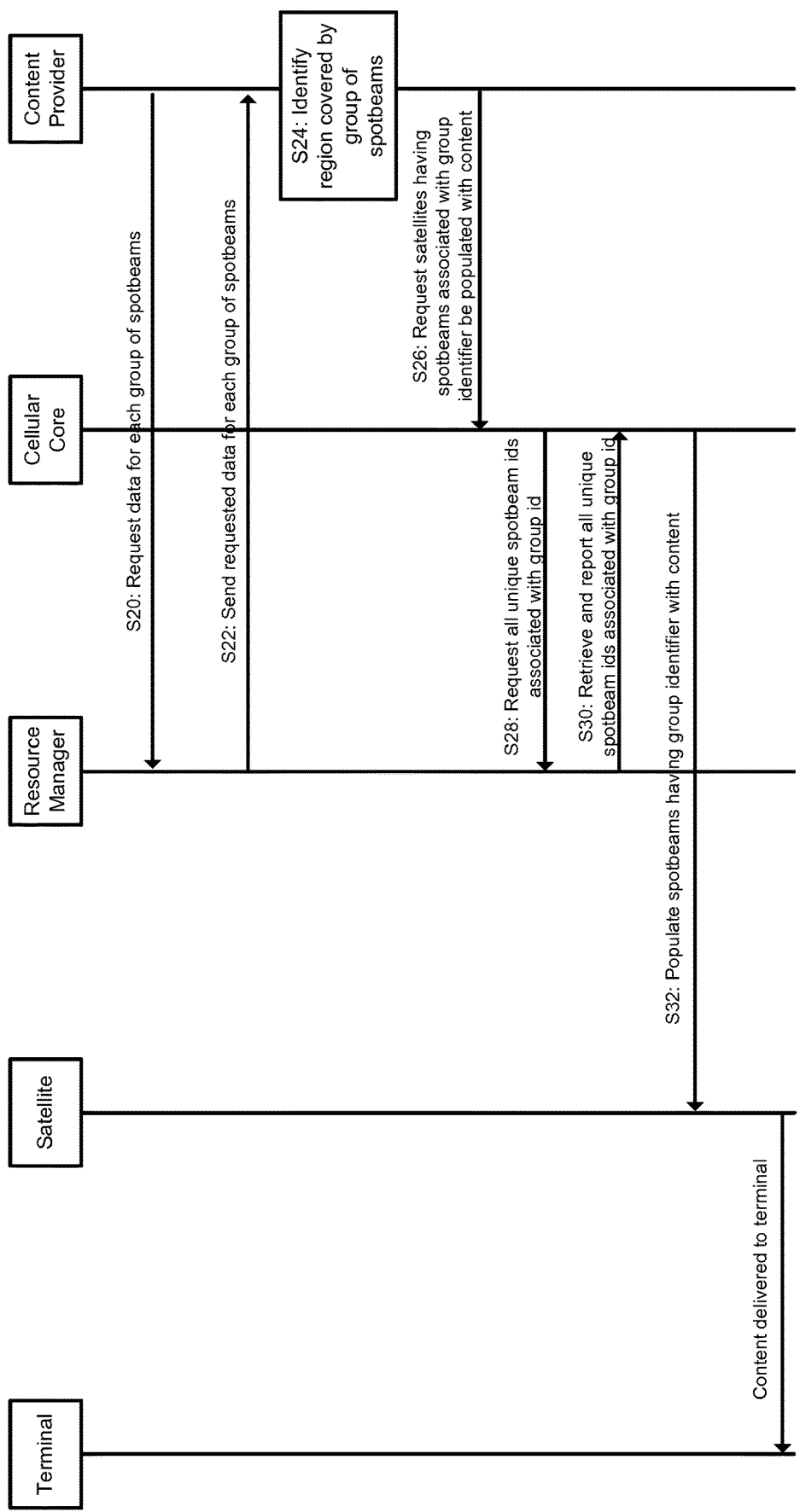
FIG. 11 is a call flow diagram illustrating a third embodiment of a method of the present disclosure.

In 20 as shown in FIG. 11, the first content provider 60 sends a message to the resource manager 50 requesting data of each dynamic spotbeam identifier and their associated logical satellite coverage areas. In S22, the resource manager 50 responds with the requested data, which is representative of the coverage areas shown in FIG. 10.

In S24, the first content provider 60 identifies the region covered by the dynamic satellite identifier 202 as the target region for content E. In S26, the first content provider 60 sends a request message to the cellular core network 40 requesting that all satellites having spotbeams using dynamic spotbeam identifier 202 are populated with content E. In response, in S28, the cellular core network 40 sends a message to the resource manager 50 requesting all unique spotbeam identifiers associated with the identified dynamic spotbeam identifier (=202). In S30, the resource manager 50 consults its second database to retrieve the relevant unique spotbeam identifiers (=10-B, 20-A), and reports these identifiers to the cellular core network 40.

In S32, the cellular core network 40 transmits content E to the first satellite 10 identifying it as for transmission to the second spotbeam of the first plurality of spotbeams (based on the unique spotbeam identifier 10-B) and also transmits content E to the second satellite 20 identifying it as for transmission to the first spotbeam of the second plurality of spotbeams (based on the unique spotbeam identifier 20-A). The first and second satellites 10, 20 store content E in their respective memories for subsequent transmission.

Thus, embodiments of the present disclosure provide a method by which the first content provider 60 may identify a coverage area that is made up of multiple spotbeams, even spotbeams of different satellites (which may be controlled by different entities), and populate content for transmission by the spotbeams making up that coverage area without any technical knowledge of which satellites those spotbeams are associated with. Instead, the first content provider 60 merely selects the appropriate region (collectively identified by the dynamic spotbeam identifier) from the data returned from the resource manager 50 (in 22), and instructs the cellular core network 40 to send data to that region by populating the corresponding satellite's memory or satellites' memories.

In the above embodiments, the term "satellite terminal" is used to describe a device that may send and/or receive transmissions from the satellites. However, such a device may also be able to communicate via other telecommunications protocols, such as cellular protocols (e.g. UMTS, LTE etc.) and/or wireless protocols (e.g. Wi-Fi). In this sense, the device may be considered a User Equipment (UE) which is adapted for both cellular and satellite communications, such as those of the proposed "5G" networks which include both cellular and satellite communication technologies. Furthermore, in the embodiments above where the satellite terminal sends a message to another entity, these may be sent via the cellular network or via the satellite network.

The skilled person will understand that any combination of features is possible within the scope of the invention, as claimed.

The invention claimed is:

1. A method for a satellite telecommunications system including one or more satellites, wherein the one or more satellites are configured to transmit data via a first plurality of spotbeams, the method comprising:
   analyzing data relating to the first plurality of spotbeams;
   identifying a set of spotbeams of the first plurality of spotbeams based on the analysis;
   assigning a group identifier to each spotbeam of the set of spotbeams;
   sending an update message to the one or more satellites associated with each spotbeam of the set of spotbeams, the update message including the assigned group identifier; and
   participating in distribution of content to the one or more satellites for transmission by each spotbeam of the set of spotbeams, wherein the participating uses the assigned group identifier.

2. The method as claimed in claim 1, wherein the satellite telecommunications system includes a first satellite and a second satellite, the first satellite is configured to transmit via the first plurality of spotbeams, and the second satellite is configured to transmit via a second plurality of spotbeams, and the method comprises:
   analyzing data relating to the first plurality of spotbeams and the second plurality of spotbeams; and
   identifying the set of spotbeams of the first plurality of spotbeams and the second plurality of spotbeams based on the analyzing of the data.

3. A method as claimed in claim 1, further comprising:
   receiving, from a terminal, a spotbeam identifier identifying a spotbeam that the terminal is associated with; and
   recording an association between the terminal and the spotbeam identifier, wherein the analyzing of the data relating to the first plurality of spotbeams includes analyzing data for the terminal.

4. A non-transitory computer-readable storage medium storing a computer program comprising instructions which, when the computer program is executed by a computer, cause the computer to carry out the method of claim 1.

5. A device for a satellite telecommunications system, the satellite telecommunications system including one or more satellites, wherein the one or more satellites are configured to transmit data via a first plurality of spotbeams, the device comprising a processor configured to carry out the method of claim 1.

\* \* \* \* \*